United States Patent Office 3,123,257
Patented Mar. 3, 1964

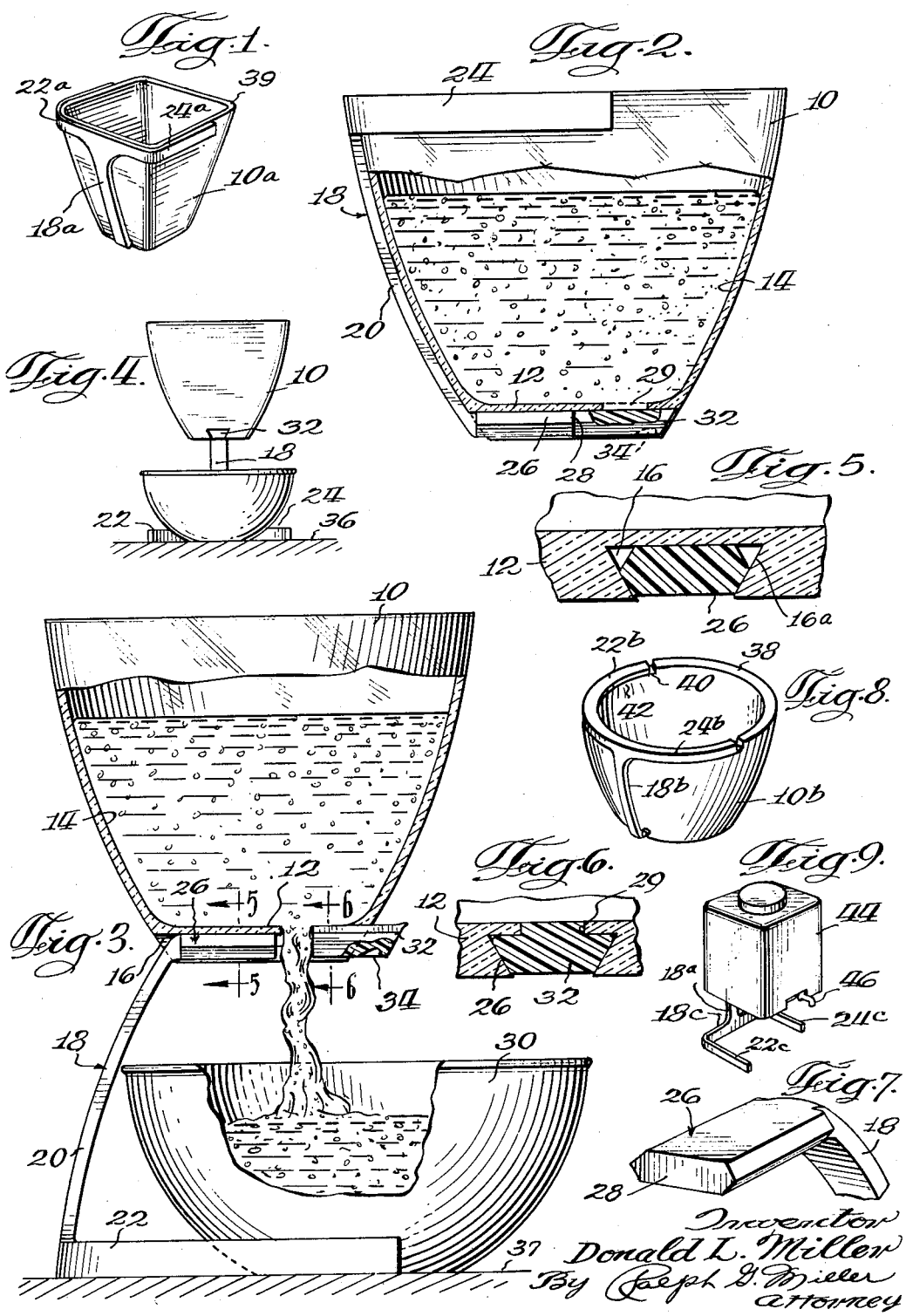

3,123,257
NESTABLE SUPPORT FOR CONTAINER
Donald L. Miller, 330 6th St., Neenah, Wis., assignor of one-third to Ralph G. Miller, Neenah, Wis.
Filed Sept. 8, 1960, Ser. No. 54,757
7 Claims. (Cl. 222—185)

This invention relates to improvements in household appliances and more particularly to improved apparatus for the spaced support of bowls or appliances.

A major object of the invention is to provide an improved support for vessels such as mixing bowls or the like adapted to be sorted in nesting relation to a vessel to provide ready availability of the support and space minimization during storage.

A further object is to provide improved apparatus for the spaced support of one mixing bowl above a second mixing bowl to eliminate the tedious manual support of an ingredient containing bowl above a second bowl during a blending operation.

Other objects and advantages of the concepts herein taught will become readily apparent to persons familiar with the art from the description and drawings.

In the drawings in which like parts are identified by corresponding reference numerals, FIG. 1 is a perspective view of a vessel of generally rectangular shape in plan, and illustrating a supporting structure in nested relation thereto in accordance with the invention, FIG. 2 shows in elevation and partly in section a mixing bowl and nesting stand, the bowl being of circular configuration in plan, FIG. 3 illustrates the bowl of FIG. 2 supported in spaced relation above a second bowl by the stand shown nested in FIG. 2, FIG. 4 is a front elevational view of the two bowls and stand shown in FIG. 3, FIG. 5 is a vertical section taken along 5—5 of FIG. 3, FIG. 6 is a vertical section along line 6—6 of FIG. 3, FIG. 7 illustrates in perspective the key-like upper end of the stand as positioned in FIG. 3, FIG. 8 illustrates a bowl and nested stand incorporating an alternate embodiment of the invention, and, FIG. 9 illustrates a beverage dispenser supported on a stand incorporating the invention.

FIGS. 2 and 3 show the inventive concepts associated with a mixing bowl of the type particularly adapted for use in blending cake mixes and the like. Bowl 10 may be of a conventional shape and includes a generally circular base portion 12 forming the bottom closure for a progressively divergent and upwardly open wall 14. As best shown in FIGS. 5 and 6, the base portion 12 of bowl 10 is of substantial thickness and is provided with a diametrically extending open ended channel 16. A complementally contoured fixed bearing portion of a support bracket is receivable in one end of channel 16 and an aperture controlling slide member is disposed in the opposite end thereof.

FIG. 2 shows a support bracket 18 in nested relation to bowl 10. Bracket 18 comprises an arm portion 20, one end of which leads into a pair of branched supporting feet 22 and 24 of semi-circular configuration. With bracket 18 in the nested position of FIG. 2, feet 22 and 24 snugly engage portions of bowl 10 marginally of the upwardly open end thereof. The opposite or upper end of bracket arm 20 leads into a key-like fixed bearing portion 26 slidably receivable within channel 16 in either of two diametrically opposed positions, i.e., with bracket 18 in the nested position of FIG. 2 or in the supporting position of FIG. 3. Arm 20 snugly engages the side wall 14 of bowl 10 when the bracket is nested with bearing portion 26 disposed within channel 16. Since feet 22 and 24 forming the base of bracket 18 engage bowl 10 marginally of the open end thereof, the bowl and nested bracket may be stored within a space only slightly larger than that required for the bowl. Arms 22 and 24 are preferably of a length to extend slightly beyond the mid-section of the bowl, the arms being sufficiently flexible to expand and then snap back somewhat as the free ends thereof are forced beyond the center of the bowl during nesting of the bracket to the FIG. 2 position. The arms are shaped to the contour of the associated article, hence are of semicircular configuration when employed with the circular bowls of FIGS. 2, 3, 4 and 8 and of U-shape when employed with either the generally rectangular bowl of FIG. 1 or with other rectangular articles such as the beverage dispenser of FIG. 9.

As shown in FIGS. 3, 5, and 6, the relatively thick base portion 12 of bowl 10 is provided with an open ended diametrically extending channel 16 a portion of which is of lesser depth than the base thickness. Side wall forming surfaces 16a defining channel 16 converge downwardly to provide a suitable guideway for a hexagonically shaped bearing portion 28 of bracket 18, FIG. 7, it being apparent that bearing 26 may be inserted in guideway 16 in either the nesting position of FIG. 2 or in the article supporting position of FIG. 3. Channel 16 opens at 29 into bowl 10 at one end of channel 16 to provide an outlet port for the gravity feed of ingredients from bowl 10 down into a second bowl 30 when bowl 10 is supported as shown in FIG. 2. For the purpose of controlling the flow of mixed ingredients through outlet port 20 a suitable closure member 32 is slidably disposed within channel 16 and may be provided with a finger depression 34 for movement of member 32 between positions opening and closing port 29 as shown in FIG. 3 and FIG. 2, respectively. Slide member 32 may be centrally provided with a ridge portion 36 as shown in FIGS. 3 and 6 or it may be of a configuration similar to the fixed bearing 26 with the top surface thereof forming a bottom closure wall for aperture 29, FIG. 2.

To convert the nested stand of FIG. 2 to the position of use shown in FIG. 3, stand 18 is withdrawn laterally from container 10 to disengage feet 22 and 24 from marginal engagement with the bowl and to withdraw bearing portion 26 from the base channel 16. The stand thus completely disengaged from the bowl is manually rotated through a 180° arc and while in that position bearing portion 26 is reinserted in channel 16 to position the stand to below the bowl as shown in FIG. 3. Due to the complemental relationship between the cross sectional configuration of bearing 26 and the corresponding configuration of channel 16, the stand is thus securely attached to the bowl and with forked feet 22 and 24 placed on a supporting surface 37, FIG. 3, bowl 10 is positioned in spaced relation to that surface. Ingredients mixed in bowl 10 may be gravity fed, during a blending operation, for example, into bowl 30 by partial withdrawal of closure member 32 to open port 29. The advantages of supporting bowl 10 above bowl 30 while permiting a controlled feed of mix being folded into other ingredients in bowl 30 which must be continuously rotated, will be apparent to persons familiar with the preparation of cakes and the like.

Other adaptations and modifications of the concept herein taught are illustrated in FIGS. 1, 8 and 9. In FIG. 1, bowl 10a is of generally rectangular configuration in plan with the walls thereof converging toward the base. Bracket 18a is provided with feet portions 22a and 24a which assume a rectangular configuration for snug engagement with opposite walls of the bowl at a position immediately under the marginal lip 39.

FIG. 8 illustrates a bowl 10b circular in plan, and converging toward the base and provided with a lip portion 38 etxending partially around the circumference thereof but undercut at 40 to provide a lower offset lip 42 which extends through the remainder of the bowl's circumference. Lip portion 42 is offset sufficiently to permit semicircular feet portions 22b and 24b of bracket 18b to rest thereon with the upper surface of the feet as shown in the plane of lip 38 to give the margin of the bowl a symmetrical appearance when bracket 18b is in the storage position shown.

FIG. 9 illustrates a bracket 18c which is similar in configuration to bracket 18a of FIG. 1, providing support for a beverage dispenser 44 at a sufficient elevation to permit vessels to be positioned under dispensing nozzle 46. While not shown, the bracket 18c is detachably connected to dispenser 44 in the manner taught herein and is nestable, when reversed in position, with feet 22c and 24c engaging opposite side walls of the rectangular dispenser 44. While the invention has primary utility in connection with blending bowls and the like to relieve an operator of the necessity of simultaneously supporting one blending bowl above another while continuously rotating the lower bowl, the concept thus has other applications in the support of appliances and other devices which are normally stored during periods of non-use but which must be positioned above a supporting surface during periods of use.

This application is a continuation-in-part of applicant's pending application entitled "Mixing Bowl," Serial No. 835,714, filed August 24, 1959 and now abandoned.

I claim:

1. In combination, an article having walls and a base portion provided with a keyway, a stand for the support of said article including a key portion adapted to be slidably received in said keyway and a bifurcated supporting base portion spaced from said key portion and adapted to serve the dual function of positioning said article above a supporting surface when said bifurcated portion is locked by said key when in one position spaced below said article base portion, said key portion being adapted alternately to be locked in said keyway in a diametrically opposed position with said bifurcated portion nested against said article wall portions and spaced from said keyway in a position of non-use.

2. The device of claim 1 wherein said article includes side walls of generally circular configuration and said bifurcated stand portion comprises a pair of branching semicircular elements adapted snugly to engage the circular walls of said article throughout a major portion of the circumference thereof when in nested engagement with said article.

3. The device of claim 1 wherein said article includes side walls of generally rectangular configuration and the bifurcated portion of said stand comprises a pair of branching elements defined in rectangular configuration complementing the configuration of said rectangular article wall for snug fit nested engagement therewith.

4. The device of claim 1 wherein said keyway extends horizontally through a central portion of the article's base and includes a pair of opposed side walls converging toward the lower surface of the base and the key portion of said stand is of a cross sectional configuration complementing the configuration of said keyway for snug fit slidable engagement therewith.

5. The device of claim 4 wherein a portion of said keyway opens upwardly through the base of said article to provide a port for the gravity flow of material from said article, and slide means manually operable between positions opening and closing said port.

6. In combination, a mixing bowl the base of which includes a keyway extending horizontally through the central portion thereof, a stand for the spaced support of said bowl above a surface, said stand comprising a key portion receivable in said keyway, a support arm disposed intermediate said keyway and a bracket-like base portion of a configuration complementing the configuration of the upper portion of said bowl, said keyway and the key portion of said base being of such complementary configuration as to prevent rotatable movement between the bowl and stand, the key portion of said stand extending only partially through the keyway when inserted therein, a transfer port provided in said base and through said keyway laterally of the inserted position of said key portion for the gravity flow of material from said bowl, and a closure member for said port slidably receivable within said keyway and manually operable between positions opening and closing said port, said stand being engagable both in nested relation to said bowl and in a diametrically opposed position with the base of said stand spaced below said bowl for the support thereof above a work surface.

7. The device of claim 6 wherein said bowl has a lip portion offset below the remainder of the circumference, and the base of said stand is of a configuration to be positioned, when in the nested position, on said offset lip portion with a surface of the base of said stand in substantially the plane of the remainder of the lip References Cited in the file of this patent

UNITED STATES PATENTS

| 1,553,113 | Rutt | Sept. 8, 1925 |
| 1,845,040 | Barroll | Feb. 16 1932 |

FOREIGN PATENTS

| 546,778 | Great Britain | July 29, 1942 |
| 605,518 | Great Britain | July 26, 1948 |